Jan. 14, 1964  R. M. BRADY ETAL  3,117,363
METHOD OF AND APPARATUS FOR INSERTING A SUPPORT INTO A COIL
Filed Oct. 21, 1960  6 Sheets-Sheet 2

INVENTORS.
ROBERT M. BRADY,
CARL LENZ, dec'd
EARL J. ABERLE, EXR.,
OLEG J. OREBIC.
BY R. J. Leek Jr.
ATTORNEY Jan. 14, 1964 R. M. BRADY ETAL 3,117,363
METHOD OF AND APPARATUS FOR INSERTING A SUPPORT INTO A COIL
Filed Oct. 21, 1960 6 Sheets-Sheet 3

INVENTORS.
ROBERT M. BRADY,
CARL LENZ, dec'd
EARL J. ABERLE, EXR.,
OLEG J. OREBIC.
BY RJ Leek Jr.
ATTORNEY.

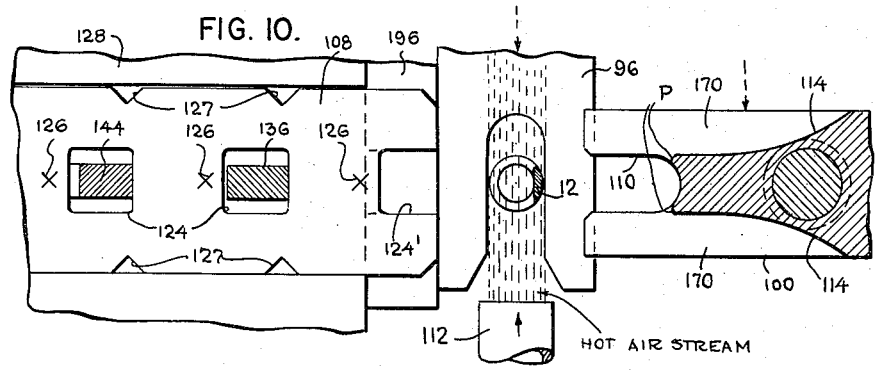
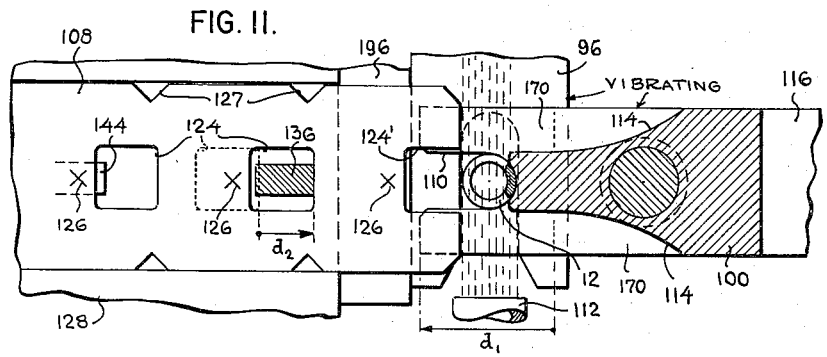
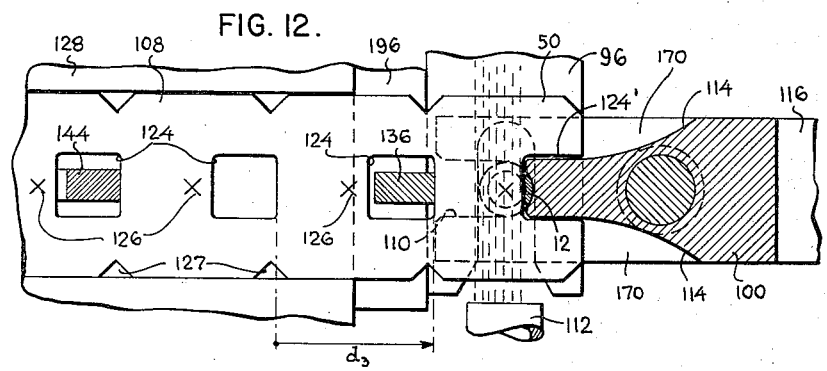
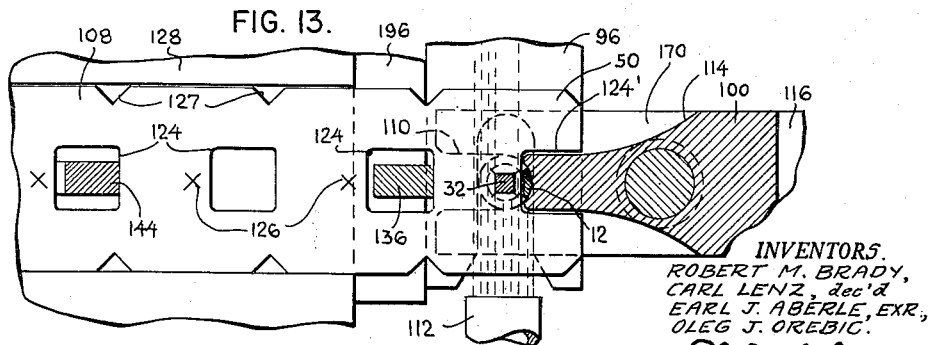

Jan. 14, 1964 R. M. BRADY ETAL 3,117,363
METHOD OF AND APPARATUS FOR INSERTING A SUPPORT INTO A COIL
Filed Oct. 21, 1960 6 Sheets-Sheet 5
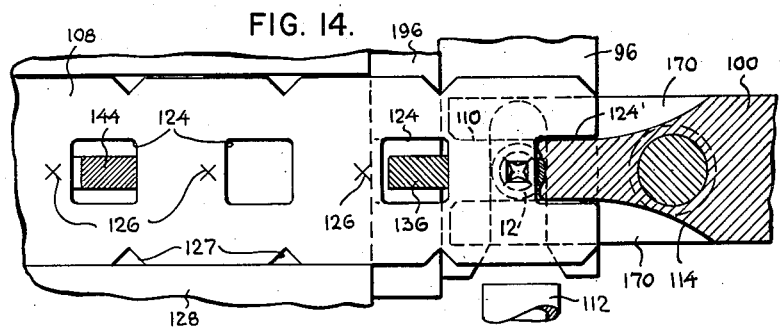
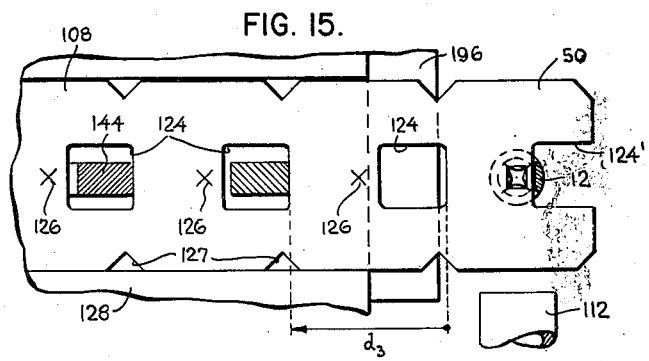
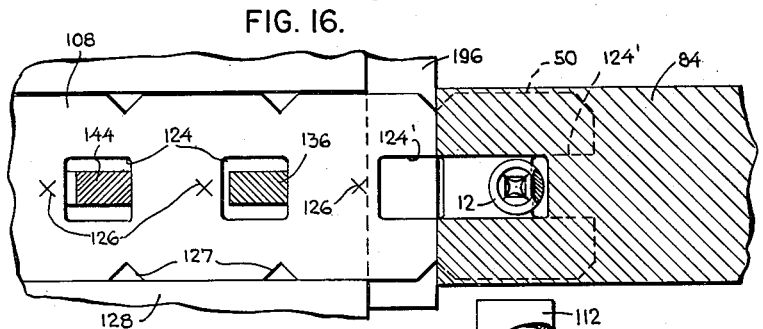
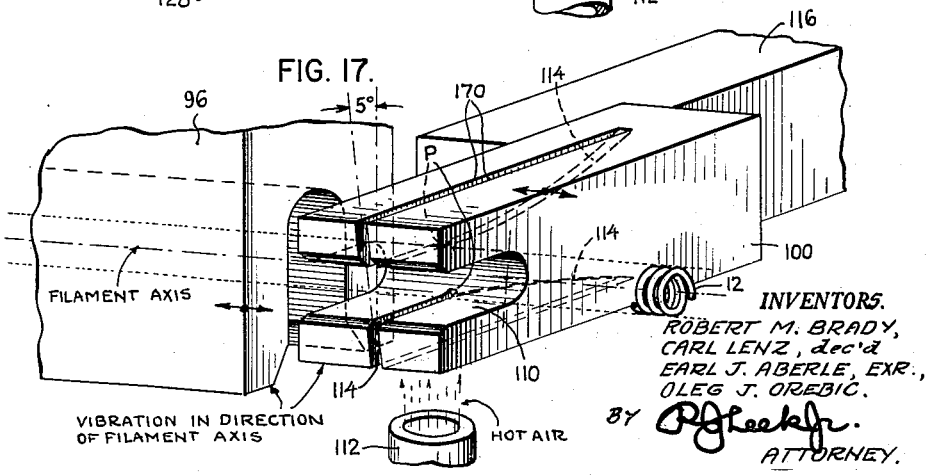
INVENTORS.
ROBERT M. BRADY,
CARL LENZ, dec'd
EARL J. ABERLE, EXR.,
OLEG J. OREBIC.
BY
ATTORNEY.

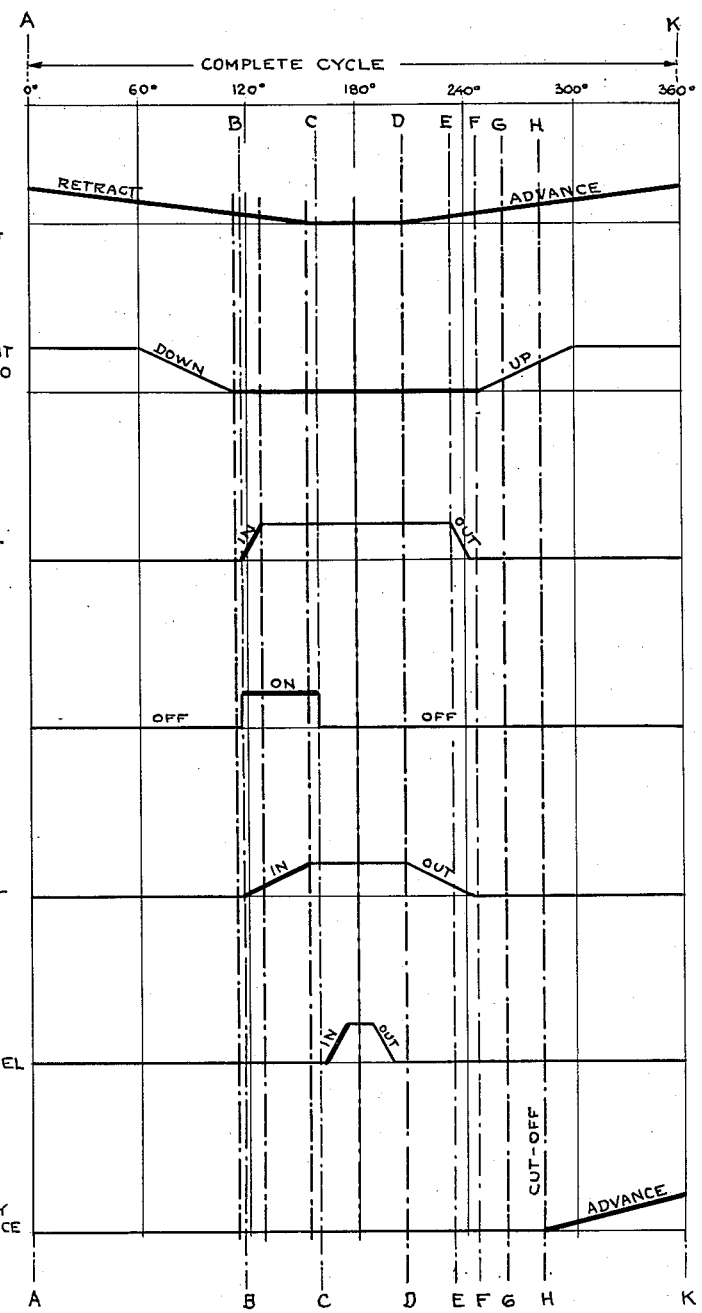

United States Patent Office 3,117,363
Patented Jan. 14, 1964

3,117,363
METHOD OF AND APPARATUS FOR INSERTING
A SUPPORT INTO A COIL
Robert M. Brady, Hazlet, and Carl Lenz, deceased, late of Wayne, N.J., by Earl J. Aberle, executor, Wayne, N.J., and Oleg J. Orebic, New York, N.Y., assignors to Westinghouse Electric Corporation, East Pittsburgh, Pa., a corporation of Pennsylvania
Filed Oct. 21, 1960, Ser. No. 64,203
7 Claims. (Cl. 29—25.19)

The present invention relates to the manufacture of infrared ray generating devices or heat lamps and, more particularly, to an improved auxiliary support and an improved method of and apparatus for mounting auxiliary supports between the turns of a filament at one or more spaced points along the length of such filament.

Heretofore, the conventional auxiliary supports for the coiled tungsten filament of a heat lamp (of the type shown in U.S. Patent No. 2,864,025, issued December 9, 1958 to A. G. Foote et al.) have been satisfactorily inserted into and secured to the filament by apparatus of the type shown in U.S. Patent No. 2,813,327, issued November 19, 1957, to E. G. Fridrich. This conventional apparatus efficiently performs the inserting task because the filament has not been flashed prior to the inserting operation and hence attendantly is not brittle but is, in fact, relatively flexible and resilient. Thereafter, in the conventional manufacturing process of such heat lamps, the filament is flashed (after the sealing and exhaust operations) by apparatus of the type shown in U.S. Patent No. 2,832,661, issued April 29, 1958, to E. H. Wiley. If the filament breaks during this flashing operation the nearly completed lamp becomes a shrinkage item.

In order to reduce the unit cost of broken filament shrinkage it has been found desirable to flash the filament before the insertion of the auxiliary supports into such flashed filament. Use of the above-mentioned conventional patented support inserting apparatus with the preflashed brittle filament results in unacceptably high filament shrinkage.

Further the conventional inserting apparatus punches the auxiliary support from the strip after the strip is inserted into the filament, thus leaving considerable strip waste. In addition, in the conventional inserting apparatus the strip is inserted into the filament by hand aided by he force of gravity and by vibration of the strip. The manual force applied to the filament during the strip feeding operation is variable and often results in breakage of the flashed brittle filaments. During and after the support inserting operation, the conventional inserting apparatus does not anneal the filament and during such inserting operation the flashed filament is supported on only one side.

Other disadvantages of the conventional inserting apparatus are that, first, it is difficult to load the filament into the insering apparaus and that, secondly, the cleaned hydrogen baked filament often becomes contaminated by the lubrication on the filament locating and filament advancing mechanisms. Additionally, during the support piercing operation, wherein a portion of the support is peened over a turn of the filament, the associated vibration of the piercing tool often breaks the brittle flashed filament. Further, the filament advancing mechanism of the conventional inserting apparatus is complicated and difficult to maintain and applies destructive stretching forces to the brittle flashed filament during the filament advancing operation. Again, the conventional inserting apparatus is hand operated and is not automatic.

Additionally, the conventional strip is provided with a slit which must be forced over the connecting half turn of the successive predetermined turns between which the strip is inserted. The flashed and brittle filament will not withstand this force and considerable filament breakage results.

It is the general object of the present invention to avoid and overcome the foregoing and other difficulties of and objections to prior art practices by the provision of an improved apparatus for and method of efficiently mounting auxiliary supports between successive turns of a flashed and brittle filament of a heat lamp with a minimum of filament breakage.

Another object of the present invention is to provide an improved mounting method which eliminates the step of, and improved mounting apparatus which eliminates the mechanism for, punching the auxiliary support from the strip after the insertion operation and which by severing the preformed mount auxiliary support from the strip eliminate strip waste and reduce shock forces on a flashed and brittle filament.

Yet another object of the present invention is the provision of improved mounting apparatus which provides an automatic positive strip feed mechanism, thus eliminating manual feeding of the strip into the filament and also the attendant variable inserting force heretofore manually applied to such filament.

Still another object of the present invention is the provision of improved mounting apparatus and method which provide annealing for the flashed brittle filament during the inserting operation.

A still further object of the present invention is the provision of improved mounting apparatus which supports or backs up the filament on, and adjacent to, the line of insertion during the support inserting operation so that the inserting force is applied by the strip to a supported portion of the filament.

A still further object of the present invention is the provision of an improved mounting apparatus, into which the cleaned filament can be readily and easily loaded and which will maintain the cleaned filament in such clean condition.

Another object of the present invention is the provision of an improved mounting apparatus which uses an improved strip provided with a prescored pierce mark thereby facilitating the supporting piercing operation, eliminating the need for vibration of the piercing tool during such support piercing operation, and reducing filament breakage.

Yet another object of the present invention is the provision of an improved mounting apparatus having a simplified filament advancing mechanism which substantially eliminates any destructive contact with the filament during such filament advancing operation.

Another object of the present invention is the provision of an improved mounting apparatus which is automatic in its operation.

A still further object of the present invention is the provision of an improved strip which minimizes contact with the filament during the inserting operation and appreciably reduces filament breakage.

The aforesaid objects of the present invention, and other objects which will become apparent as the description proceeds, are achieved by providing an improved strip and improved apparatus for and method of mounting auxiliary supports between the successive turns of a filament for a heat lamp at one or more spaced points on such filament.

The improved strip of the present invention comprises a leading auxiliary support adapted to be inserted between predetermined successive spaced turns of said elongated filament and a plurality of other auxiliary supports each formed in end-to-end relation along a cut-off line. The leading auxiliary support is provided with a pierce mark for facilitating the peening of said leading auxiliary support to one of the predetermined successive turns and is provided also with an open slot on its leading edge. This open slot has a width greater than the outside diameter of the filament to avoid contact between the leading portion of said leading auxiliary support and the filament during the insertion of the leading auxiliary support into the filament. Each of the other auxiliary supports are provided with a similar pierce mark and a closed slot of the same width as said open slot, with a portion of said closed slot overlapping an adjacent cut-off line. The first closed slot adjacent said leading auxiliary support is formed into an open slot when the leading auxiliary support is severed from said strip.

The improved mounting method comprises the steps of positioning the predetermined successive turns of the filament for the inserting operation; centralizing the portion of the filament beyond the predetermined successive turns for the inserting operation; supporting the filament transverse to the line of insertion and at the point of insertion; vibrating the supported filament during the inserting operation to open the predetermined successive turns and to guide the leading auxiliary support between the predetermined successive turns; inserting the leading auxiliary support between the predetermined successive turns until the back of said open slot is contiguous to but not in contact with a connecting half turn between the predetermined successive turns; securing the inserted leading auxiliary support to the filament by moving a piercing mandrel through the filament and through the pierce mark to peen the protruding edges of the pierce mark on the leading auxiliary support over against the filament; and severing the inserted leading auxiliary support from the strip along the adjacent cut-off line while advancing the filament for the next inserting operation.

The improved mounting apparatus has positioning means movable from a retracted filament loading position to a filament presenting position for positioning the predetermined successive turns of the filament for the inserting operation. Centralizing means adjacent the portion of the filament beyond the predetermined successive turns then moves from a filament clearance position to a filament guiding position for aligning this extending portion of the filament for the inserting operation. Back-up supporting means then move from a retracted position into engagement with the filament to support the filament transverse to the line of insertion and at the point of insertion. Vibrating means associated with the back-up supporting means vibrate the supported filament during the inserting operation to open the predetermined successive turns and to guide the strip therebetween. Strip inserting means aligned with said predetermined successive turns insert the leading auxiliary support between the predetermined supported successive turns so that the open slot clears the filament and to a point where the back of the open slot is contiguous to, but not in contact with, a connecting half turn between said predetermined successive turns. Securing means disposed within said filament then move through the filament and through the pierce mark to peen the protruding edges of the pierce mark on the inserted leading auxiliary support over against the filament, thus locking the inserted leading auxiliary support to said filament. Then severing means adjacent the back-up supporting means move in a direction parallel the longitudinal axis of the filament to sever the inserted leading auxiliary support from the strip along the adjacent cut-off line to form the closed slot adjacent the leading auxiliary support into an open slot. Thereafter the severing means advances said filament for the next inserting operation.

For a better understanding of the present invention reference should be had to the accompanying drawings, wherein like numerals of reference indicate similar parts throughout the several views, and wherein:

FIGS. 10–16 are enlarged fragmentary sectional views illustrating the sequential operation of the improved mounting apparatus, with FIG. 10 being taken along the line X—X of FIG. 4 in the direction of the arrows;

FIG. 17 is a perspective view of the back-up anvil, associated centralizing guide, filament and annealing means;

FIG. 18 is a timing diagram showing the sequential operation of the operating elements and mechanisms of the support inserting apparatus.

Although the improved strip, apparatus and method of the present invention are broadly applicable for the mounting of auxiliary supports between predetermined successive turns of a longitudinal filament with each support straddling a connecting half turn of said successive turns, the strip, apparatus and method of the present invention are particularly adapted for use in conjunction with the mounting of auxiliary supports in a filament for a heat lamp and hence it has been so illustrated and will be so described.

Figure 1:
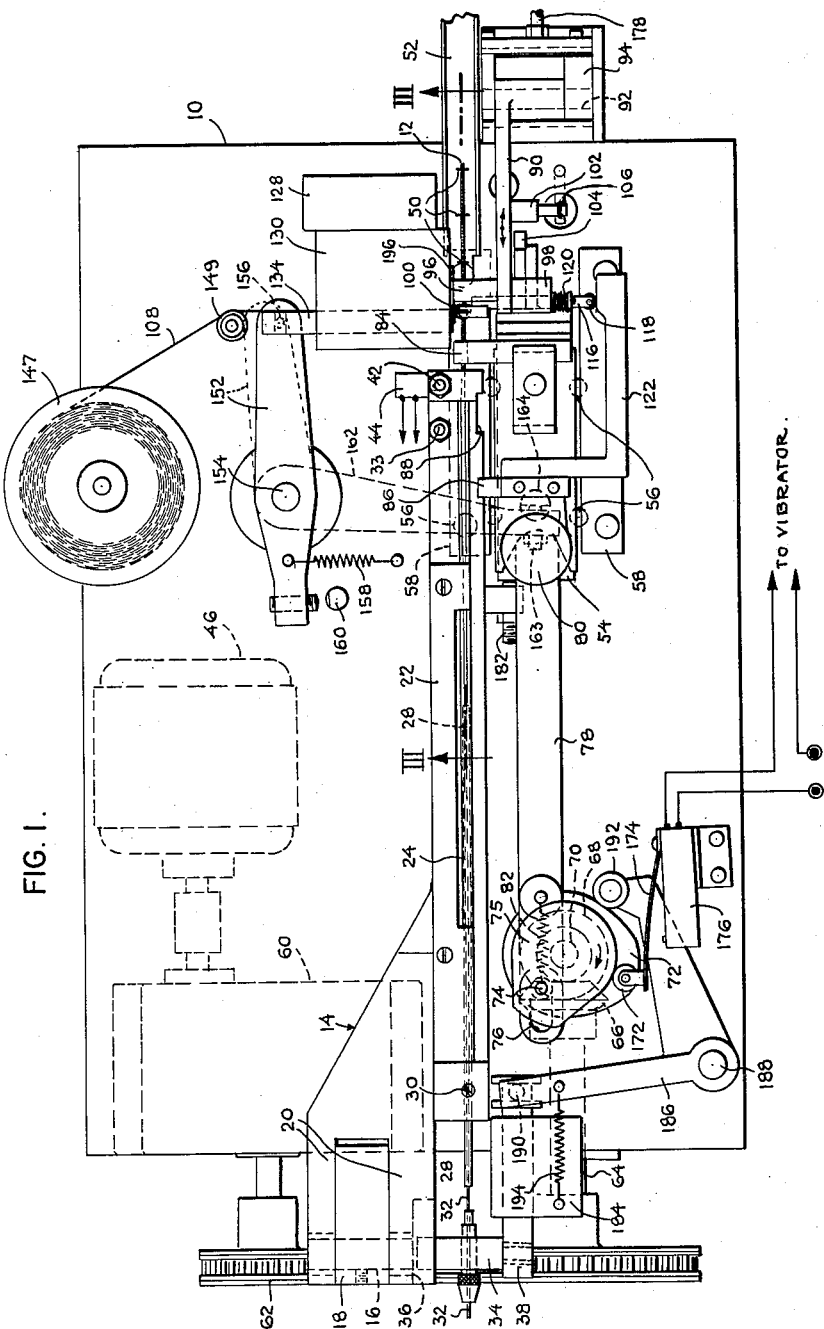
FIG. 1 is a plan view of the improved support mounting apparatus of the present invention and showing the position of the operating elements thereof at the time indicated by the line "D—D" in FIG. 18.
Figures 2, 3:
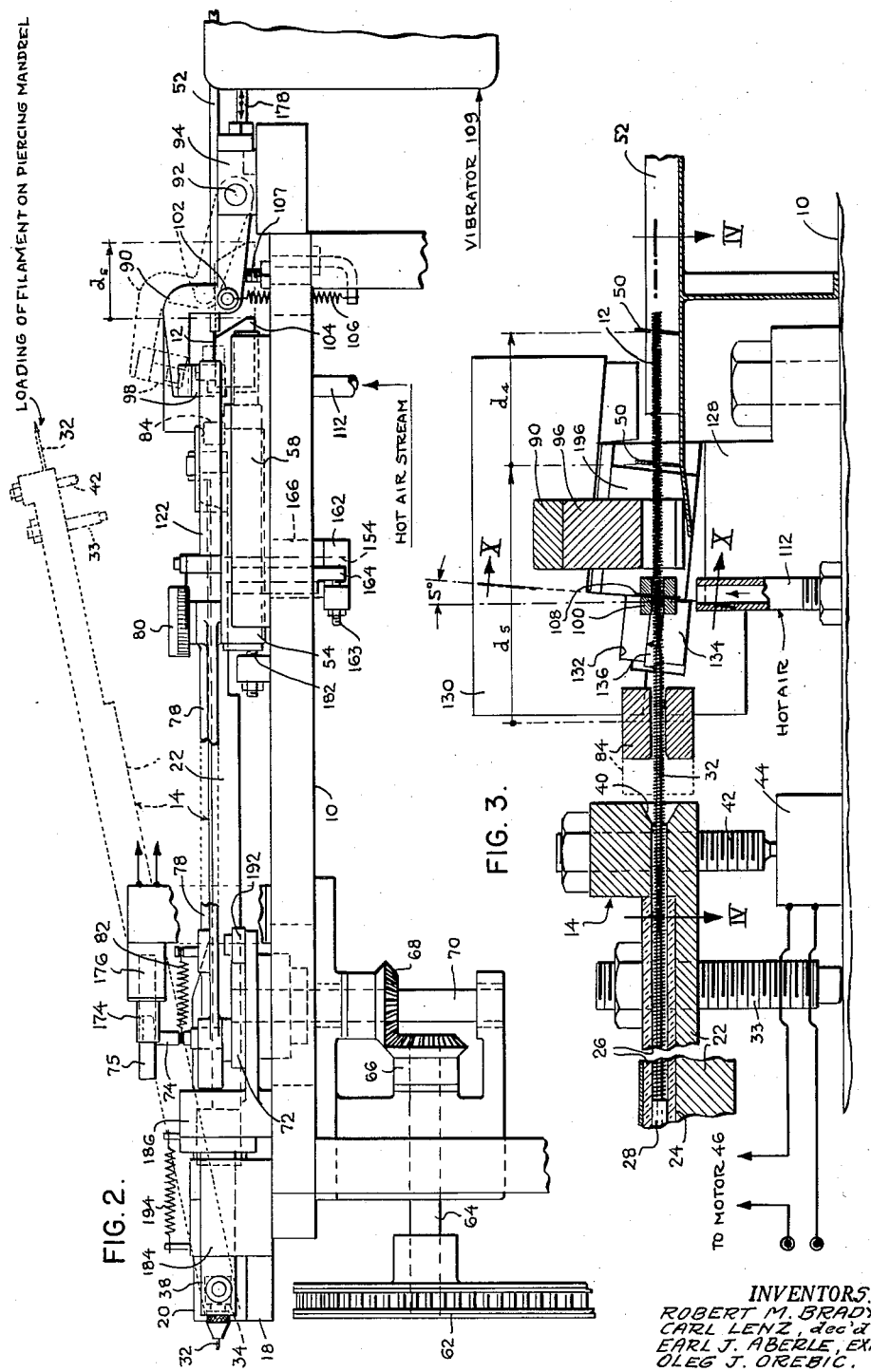
FIG. 2 is a side-elevational view of the apparatus shown in FIG. 1.
FIG. 3 is an enlarged vertical-sectional view along the line III—III of FIG. 1 in the direction of the arrows.

With specific reference to the form of the present invention illustrated in the drawings, and referring particularly to FIGS. 1 and 2, a frame for the improved mounting apparatus of the present invention is indicated generally by the reference numeral 10.

At the beginning of the auxiliary support mounting operation a filament 12 (FIGS. 1 and 2) is first loaded into a filament supporting means.

*Filament Supporting Means*

This filament supporting means (FIGS. 1 and 2) has a filament holder 14 which is manually pivotable (on a pivot rod 16 extending from a block 18 on the frame 10 and into the bifurcated end 20 of the filament holder 14) from the solid-line position shown in FIG. 2 to the dotted-line or filament loading position shown in such figure. A main longitudinal body 22 of the filament holder 14 is provided with a longitudinal cavity 24, which contains a transparent vitreous protective tube 26 adapted to protect the hydrogen cleaned filament 12 from lubricating material on the mounting apparatus and to permit visual observation of the position and condition of such filament 12. Disposed within the vitreous protective tube 24 is a filament locating tube 28 which is secured in the longitudinal cavity 24 at 30, as by a screw, and serves as a guide tube for a piercing mandrel 32 which is longitudinally reciprocable in the filament locating tube 28. This piercing mandrel 32 has a pyramidal type operating end.

In order to permit the pivotable movement of the filament holder 14 from the solid-line position (FIG. 2) to the dotted-line or filament loading position shown in this figure (and at the same time to prevent breakage of the piercing mandrel 32), it is essential that a support block 34 for such piercing mandrel 32 register with the pivot rod 16 at the time of the pivotable movement of the filament holder 14. So that this registry of the pivot rod 16 and support block 34 can be accomplished and also so that the piercing mandrel 32 may later reciprocate within the filament locating tube 28 and a forward guide aperture 40 in the filament holder 14, the support block 34 is horizontally reciprocable at one end (FIG. 1) in a slot 36 in the bifurcated end 20 of the filament holder 14 and is rotatably mounted at the other end in a reciprocable operating slide 38 of the reciprocating mechanism for such piercing mandrel 32. When the interlock arm 86 (mounted on a carriage 54, FIGS. 1 and 2) is in registry with a clearance slot 88 in the filament holder 14, the filament holder 14 can be pivoted to the dotted-line loading position (FIG. 2) at which time the pivot rod 16 and support block 34 are in registry. As the filament holder 14 moves to the dotted-line position of FIG. 2, movement of an operating rod 42 (FIG. 3) therewith, opens a safety switch 44 thus deenergizing a motor 46 (FIG. 1) which drives the automatic mounting apparatus thus preventing damage to the piercing mandrel 32 by movement of the support block 34 out of registry with the pivot rod 16. The horizontal position of the filament holder 14 (FIG. 3) is determined by an adjustable bolt 33 carried by the filament holder 14 and engageable with the frame 10.

After the filament holder 14 is moved to the dotted-line position shown in FIG. 2, a filament 12 is slid over the piercing mandrel 32 and through the forward guide aperture 40 in the filament holder 14 until the inserted end of such filament 12 engages the forward end of the filament locating tube 28, which tube 28 functions as a stop to locate the filament 12 for the insertion of the first auxiliary support 50 therein. The now loaded filament holder 14 is then manually returned to the solid-line position shown in FIG. 2 preparatory for such first insertion operation. The adjustable stop 33 (FIG. 3) carried by the filament holder 14 engages the frame 10 to determine the solid-line position of the loaded filament holder 14.

This above-described filament supporting means permits fast and facile loading of the filament 12 therein, protects the cleaned filament 12 from deleterious materials and permits visual observation of the filament 12 at all times.

From a consideration of FIG. 3 it will be apparent that the auxiliary support mounting operation which will now be described concerns the mounting of a third auxiliary support 50, since the filament 12 shown in FIG. 3 has two such auxiliary supports 50 already mounted in the filament 12. These two mounted auxiliary supports 50 are shown in FIG. 3 resting on a U-shaped channel 52 which is aligned with the filament holder 14 when the latter is in the position shown in FIGS. 3 and 4.

Before proceeding with the description of the mounting of the third auxiliary support 50 in the filament 12, reference is made to the slidable carriage 54 (FIGS. 1 and 2) which is reciprocable horizontally with respect to the frame 10 by a drive means. This carriage 54 carries a pair of rollers 56 on each longitudinal side of the carriage 54, each of which pairs of rollers 56 ride on a track 58.

Drive Means

The hereinbefore mentioned motor 46 (FIG. 1) comprises the primer mover for the drive means and is connected by means of a gear reduction unit 60 and a chain drive 62 (FIGS. 1 and 2) to a horizontal stud shaft 64. This stud shaft 64 is connected by bevel gears 66 and 68 to a vertical cam shaft 70 which is journalled in the frame 10 and carries a piercing mandrel operating cam 72 on its upper portion, which upper portion extends above the frame 10.

A post 74 (FIGS. 1 and 2), eccentrically mounted on the piercing mandrel operating cam 72, carries a vibrator operating cam 75 so that the latter cam 75 is rotated by, and concentrically with, the piercing mandrel cam 72. This post 74 extends through a longitudinal slot 76 in one end of a connecting link 78, the other end of which connecting link 78 is adjustably connected at 80 to the carriage 54. The adjustable connection 80 determines the forward position of the carriage 54 and hence the points of insertion of the supports 50 in the filament 12 as hereinafter explained. The connecting link 78 is biased by means of a spring 82 so that the right-hand end of the longitudinal slot 76 (as viewed in FIG. 1) normally rests against the post 74. Rotation of the cams 72 and 75 by the above-described linkage in, for example, clockwise direction, as shown in FIG. 1, causes horizontal reciprocable movement of the carriage 54 on the tracks 58.

As the carriage 54 is moved (at time A—A, FIG. 18) by the above-described drive means from the extreme forward or right-hand position (when viewed in, but not shown in FIGS. 1 and 2) to the left, a movable cutter 84 (mounted on the carriage 54) is retracted also toward its starting position and the interlock arm 86 (carried by the carriage 54) moves out of registry with the clearance slot 88 on the filament holder 14 and over the side of the filament holder 14 to hold the latter against the frame 10.

During this leftward movement of the carriage 54, as viewed in FIGS. 1 and 2, a centralizing guide and a back-up anvil means is moved from the dotted-line position shown in FIG. 2 to the solid-line position shown in such figure.

Back-Up Anvil and Centralizing Guide means

In order to accomplish this movement of the centralizing guide and back-up means, such assembly has an arm 90, which arm 90 is pivoted at 92 on a bracket 94 and carries a centralizing guide 96 and a back-up anvil block 98 in which a back-up anvil 100 is mounted. Such arm 90 carries a roller 102 which rides on a cam 104 affixed to the carriage 54. Biasing means, such as a spring 106, keeps the roller 102 in engagement with the cam 104 while they are in contact with each other, and thereafter the spring 106 biases the centralizing guide 96 against an adjustable stop 107 (FIG. 2) on the frame 10 after such centralizing guide 96 has engaged (FIG. 10) and centralized the right-hand portion (FIG. 3) of the filament 12 along a line which is an extension of the longitudinal axis of the filament holder 14.

At time "B—B" (FIG. 18) a reciprocating mechanism for the back-up anvil 100 begins movement of the latter from the position shown in FIG. 10 to the filament back-up position shown in FIG. 11; a positive automatic strip feeding means begins its inserting movement of the strip 108 (FIG. 9) from the position shown in FIG. 10 to the inserted positions shown in FIG. 12; and a vibrator 109 begins to operate.

Back-Up Anvil

This back-up anvil 100 is provided with transverse back-up slot 110 (FIGS. 10–15) which is adapted to support the filament 12 (when in the forward position shown in FIG. 11) at, and adjacent to, the preselected successive turns of such filament 12 between which the third auxiliary support 50 is to be inserted into such filament 12 so that such third auxiliary support 50 straddles a connecting half turn of said predetermined successive turns. In order to guide the strip 108 into the filament 12 and to also permit passage of heated annealing air from a continuously operable hot-air annealing means (such as the tube 112, FIGS. 3, 10–17), into direct contact with the preselected turn, a vertical guide slot 114 (FIG. 17) is cut into the forward face of the back-up anvil 100 at an angle of about 5° from the vertical axis of the back-up anvil 100. This 5° angle corresponds to the pitch angle of the filament 12. As shown in FIG. 17, the vertical guide slot 114 extends into the back-up slot 110 to the points "P" so that such back-up slot 100 is able to provide solid support for the preselected successive turns during the third support inserting operation.

In order to permit horizontal reciprocable movement of the back-up anvil 100 between the positions shown in FIG. 10 and FIG. 11, an anvil reciprocating mechanism is provided, wherein such back-up anvil 100 is mounted on a slide 116 (FIGS. 1 and 17) which is slidable in the anvil block 98. As shown in FIG. 1, this slide 116 carries a roller 118 which is biased by a spring 120 into engagement with an anvil reciprocating cam 122 mounted on the carriage 54.

At the time "B—B" (FIG. 18) the continued movement of the carriage 54 and the anvil reciprocating cam 122 to the left, as viewed in FIGS. 1 and 2, causes the roller 118 to engage an inclined surface of the anvil-reciprocating cam 122. Further cam and carriage movement to the left moves the anvil 100 inwardly a distance "$d_1$" (FIG. 11) from the position shown in FIG. 10 to the position shown in FIG. 11, where the back-up slot 110 encircles and backs up the portion of the filament 12 adjacent the preselected successive turns. As a result the back-up anvil 100 supports the filament 12 on the line of insertion during the support inserting operation so that the inserting force is applied by the strip 108 to the portion of the filament 12 completely supported within the back-up slot 110 of the anvil 100.

Simultaneously at time "B—B" (FIG. 18) the strip feeding means begins the feeding of the strip 108 (FIG. 11) into the filament 12.

*Strip*

Figure 9:
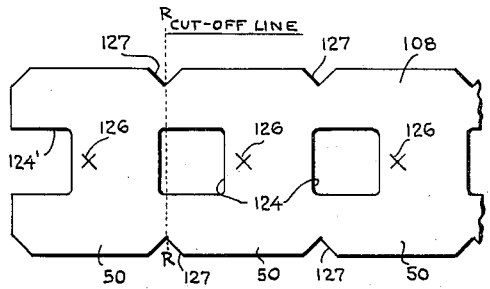
FIG. 9 is an enlarged fragmentary view of the improved strip utilized in the improved support mounting apparatus.

As shown in FIG. 9 this strip 108 which comprises a plurality of joined preformed or prestamped auxiliary supports 50, each provided with a closed slot 124 and a prescored "X-like" pierce mark 126. When the second or last mounted auxiliary support 50 (FIG. 4) was cut from the strip 108, the left-hand end of the closed slot 124 (FIG. 9) was cut off along a line similar to the cut-off line "R—R" (FIG. 9) to form a filament clearance open slot 124' for use as hereinafter related. This cut-off line "R—R" is defined by the vertices of pointed peripheral slots 127 provided in the strip 108.

Figure 6:
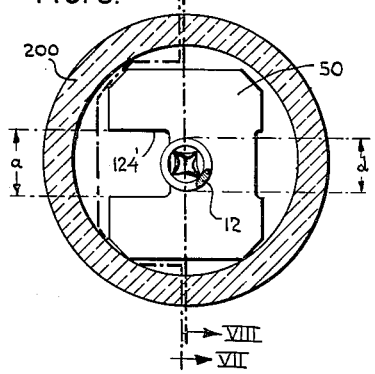
FIG. 6 is an enlarged vertical-sectional view along the line VI—VI of FIG. 5 in the direction of the arrows.
Figure 7:
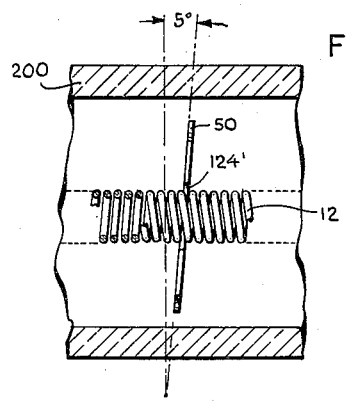
FIG. 7 is a vertical-sectional view along the line VII—VII of FIG. 6 is the direction of the arrows.

As shown in FIG. 6 the width "$a$" of the slot 124' is greater than the diameter "$d$" of the filament 12 to prevent contact between the leading portions of the strip 108 and the filament 12 during the inserting operation, thus attendantly reducing filament breakage. The thickness "$t$" of the strip 108 (FIG. 8) is greater than the turn spacing "$s$" of the filament 12, thus permitting the wedging of the strip 108 in the turn space between the successive predetermined turns of the filament 12 after the completion of the inserting operation.

At time "B—B," FIG. 18, the strip feeding means (FIGS. 1-3 and 10-16) begins to move the strip 108 from the position shown in FIG. 10 toward the position shown in FIG. 12.

*Strip-Feeding Means*

The strip feeding means (FIGS. 1-3, and 10-16) has a mounting block 128 (FIGS. 1 and 4) affixed to the frame 10, which mounting block 128 defines with a removable cover block 130 a guideway 132 in which an advancing pawl slide 134 is horizontally reciprocable by a spring actuated auxiliary drive means, operable by the reciprocable movement of the carriage.

Figure 4:
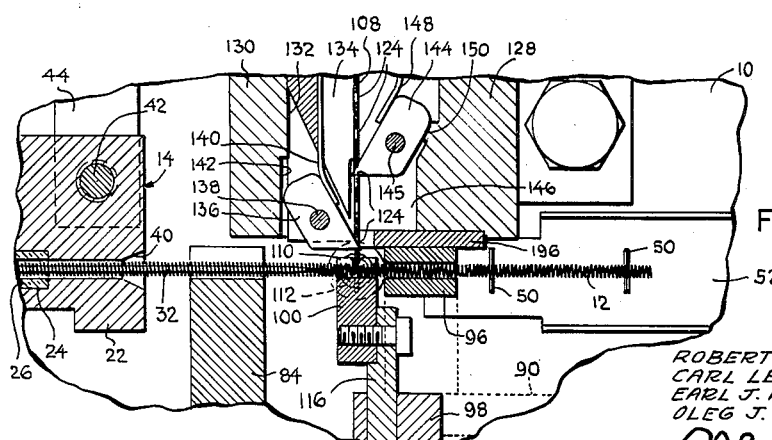
FIG. 4 is a horizontal-sectional view along the line IV—IV of FIG. 3 in the direction of the arrows.

As shown in FIG. 4 an advancing pawl 136 is pivotably mounted at 138 on the advancing pawl slide 134 and is biased in counterclockwise direction by a leaf spring 140 against a stop 142 in cover block 130 and into engagement with the adjacent closed slot 124 in the strip 108 (FIG. 10). A holding pawl 144 is pivoted at 145 in a suitable cavity 146 in the mounting block 128. A leaf spring 148 (FIG. 4) biases the holding pawl 144 in clockwise direction (FIG. 4) against a stop 150 and into engagement with a contiguous closed slot 124 in the strip 108, as shown in FIG. 10.

Referring to FIG. 1, the strip 108 is fed from a reel 147 around a roller 149 and into the angularly disposed space between the slide 134 and the mounting block 128 so that the pawls 136 and 144 engage the closed slots 124, as shown in FIG. 10. This space between the slide 134 and the mounting block 128 is disposed at an angle of 5° from the vertical axis of the strip feeding means.

The above-mentioned spring actuated auxiliary drive means for the slide 134 comprises a lever 152 affixed to a vertical shaft 154 pivotable on the frame 10. Such lever 152 is connected at 156 to the slide 134. A spring 158 biases the lever 152 in counterclockwise direction toward an adjustable stop 160 upstanding from the frame 10. A lower stop arm 162 affixed to the vertical shaft 154 carries an adjustable bolt 163 which is disposed in the horizontal reciprocable path of movement of a post 164 depending from the carriage 54. The stop 160 limits the forward counterclockwise movement (FIG. 1) of the bolt 163. This post 164 is reciprocable by the carriage 54 in a longitudinal slot 166 in the frame 10.

As the carriage 54 is retracted to the left (FIGS. 1 and 2), the post 164 rotates the lower stop arm 162, vertical shaft 154 and lever 152 (against the action of the spring 158) in clockwise direction (FIG. 1) with attendant movement of the lever 152 from the dotted-line position (FIG. 1) to the solid-line position. As a result the pawl advancing slide 134, and more particularly the advancing pawl 136, advances the strip 108 (as such strip 108 slides past the holding pawl 144) from the position shown in FIG. 10 through the intermediate position shown in FIG. 11 to the inserted position shown in FIG. 12.

From the above description it is apparent that a positive strip feeding mechanism has been provided which eliminates manual feeding of the strip 108 and the attendant variable inserting force applied to such filament 12.

As shown in FIG. 11, when the back-up anvil 100 has reached its "in" position shown in such figure, the advancing pawl 136 and strip 108 have advanced a distance "$d_2$." At the end of the travel of such strip 108 (FIG. 12), such strip 108 and advancing pawl 136 have moved through a total distance "$d_3$" (FIG. 12) which distance "$d_3$" is determined by adjustment of the adjustable bolt 163 on the arm 162 and in engagement with the post 164. During this inserting movement of the strip 108, the open filament clearance slot 124' on the leading end of the strip 108 clears the filament 12 and slides into the vertical guide slot 114, and along the inner walls 170 of the slot 114. The predetermined adjustable travel "$d_3$" (FIG. 12) of the advancing pawl 136 stops the back edge of the open slot 124' of the strip 108 an infinitesimal distance before such back edge can engage and damage the predetermined half turn of the filament 12, which half turn is a portion of the predetermined successive turns between which the strip 108 is inserted.

As indicated in FIG. 18, when the advancing pawl slide 134 starts its advancing movement at time "B—B," the vibrator 109 (FIG. 2) begins to vibrate the centralizing guide 96 and back-up anvil 100 as now described.

*Vibrator*

At the time "B—B" (FIG. 18) the vibrator operating cam 75 (FIG. 1) rotates a roller 172 and the operating arm 174 (which carries the roller 172) in counterclockwise direction to cause closure of a switch 176 and attendant energization of the vibrator 109.

This vibrator 109 is disposed adjacent the bracket 94 and has its vibrating arm 178 disposed in operative relation to the bracket 94 so that the rapid repetitive blows (in a direction parallel to the longitudinal axis of the filament 12) which such vibrating arm 178 strikes against the bracket 94 are transmitted through the arm 90 to the centralizing guide 96 and through the anvil block 98 to the back-up anvil 100.

These longitudinal vibrations, which are then transmitted to the filament 12 by the centralizing guide 96 and back-up anvil 100, open up the predetermined successive turns of the filament 12, help the strip 108 find the entrance space between the preselected turns in such filament 12 and further aid the strip 108 thread its way through the filament 12 to the above-described final position shown in FIG. 12.

As indicated in FIG. 18, the vibrator 109 remains "on" after the back-up anvil 100 has reached its "in" position shown in FIG. 11 and after the advancing pawl slide 134 and advancing pawl 136 have completed the insertion of the strip 108 into the filament 12 and have arrived at the position shown in FIG. 12, where the holding pawl 144 has engaged the left-hand closed slot 124. At time "C—C" (FIG. 18) the vibrator 109 ceases to vibrate when the switch 176 (FIG. 1) is opened by movement of the operating arm 174, which movement is caused by the vibrator operating cam 75.

Simultaneously with the arrival of the advancing pawl slide 134 and advancing pawl 136 at the position shown in FIG. 12, the carriage 54 completes its retracting movement (FIG. 18), when such carriage 54 (FIG. 2) engages an adjustable stop 182 carried on the frame 10.

Shortly thereafter (FIG. 18) the piercing mandrel 32 driven by a mandrel reciprocating means (FIG. 1) begins its forward or piercing movement.

Mandrel reciprocating means

This mandrel reciprocating means (FIG. 1) has (in addition to the hereinbefore mentioned slide 38), a slide block 184 in which the slide 38 reciprocates and a lever 186, which lever 186 is pivoted at 188 on the frame 10 and is connected at one end to the slide 38 at 190. The other end of the lever 186 carries a roller 192 which is biased by means of a spring 194 into engagement with the piercing mandrel operating cam 72.

Figure 8:
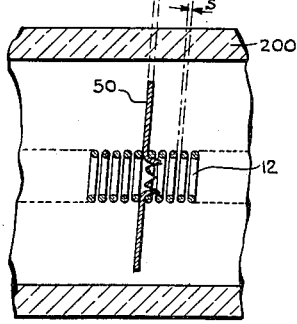
FIG. 8 is a vertical-sectional view along the line VIII—VIII of FIG. 6 in the direction of the arrows.

This mandrel reciprocating means moves the piercing mandrel 32 to the right, as viewed in FIGS. 1 and 2, within the filament locating tube 28 and the forward guide portion 40 of the filament holder 14 so that its pyramidal point pierces the center of the aligned X-like pierce mark 126 on the inserted strip 108 and peens the punched points over one of the preselected turn to lock the strip 108 to the filament 12, as shown in FIGS. 8 and 13.

It will be noted that use of the pierce mark 126 facilitates the support piercing operation and eliminates the need for vibrating the piercing tool 32 during such piercing operation, thus reducing filament breakage.

Thereafter (FIG. 18) the piercing mandrel 32 is retracted by the mandrel reciprocating means. At time "D—D," FIG. 18, the carriage 54 and movable cutter 84 begin their advancing movement and the advancing pawl slide 134 and advancing pawl 136 begin their retracting movement from the position shown in FIG. 14. During this retracting movement, the holding pawl 144 holds the strip 108 in the position shown in FIG. 14.

Thereafter at time "E—E" (FIG. 18) the horizontal retraction of the back-up anvil 100 by the anvil reciprocating mechanism is initiated. At time "F—F" (FIG. 18) the horizontal retraction of the back-up anvil 100 (through a distance "$d_1$," FIG. 11) is completed and upward rotation of such back-up anvil 100 and the centralizing guide 96 (from the solid-line position, FIG. 2, to the dotted-line position, also FIG. 2) begins when the oscillating cam 104 (FIG. 1) on the now-advancing carriage 54 begins to elevate the roller 102.

At time "G—G" (FIG. 18), and as shown in FIG. 15, the advancing pawl slide 134 and advancing pawl 136 have been retracted a distance "$d_3$" and the back-up anvil 100 and centralizing guide 96 are in the elevated dotted-line position shown in FIG. 2.

As shown in FIG. 16, the advancing movable cutter 84 (at time "H—H," FIG. 18) engages the inserted strip 108 and cuts off the mounted third auxiliary support 50 from the strip 108 (along the cut-off line "R—R," FIG. 9) against a cooperating stationary cutter 196 (FIG. 4) affixed to the mounting block 128. After the cutting operation, the now-severed and mounted third auxiliary support 50 and the filament 12 into which such support 50 is mounted, are advanced to the right, as viewed in FIGS. 1 and 2, by movable cutter 84, FIG. 3 (a distance "$d_4$," the distance between inserted supports 50), to position the next preselected successive turns of the filament 12 for the fourth support mounting operation. The total advancing travel of the movable cutter 84 is shown in FIG. 3 as a distance "$d_5$," which total advance is completed at time "K—K," FIG. 18, preparatory for such fourth support mounting operation.

Use of the movable cutter 84, as a simplified filament advancing mechanism which pushes on the severed third auxiliary support 50, eliminates any destructive contact with the filament 12 during the filament advancing operation.

Figure 5:
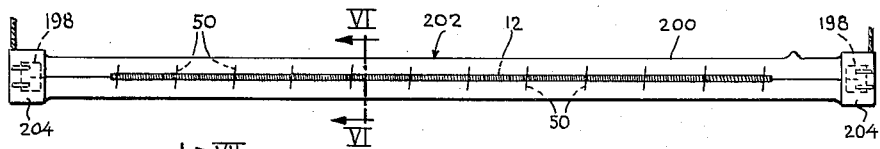
FIG. 5 is a plan view of a finished infrared ray generating device or heat lamp.

After a total of twelve such auxiliary supports 50 have been mounted in the filament 12, such filament 12 is mounted on electrode supporting structures 198 (FIG. 5), which structures 198 are then press sealed into an elongated quartz envelope 200. After sealing, the sealed lamp is exhausted and then based at 204 to provide the finished heat lamp 202 shown in FIG. 5.

It will be understood by those skilled in the art that the improved method of mounting auxiliary supports 50 in an elongated filament 12 may be practiced by hand or by other apparatus than the mounting apparatus herein disclosed.

It will be recognized by those skilled in the art that the objects of the present invention have been achieved by the provision of an improved method of, and apparatus for, mounting auxiliary supports between predetermined successive turns of a filament at one or more spaced points along the length of such filament with each of such auxiliary supports straddling a connecting half turn of said predetermined successive turns. This improved apparatus efficiently inserts the auxiliary supports into a flashed and brittle filament of a heat lamp with a minimum of filament breakage. Such improved method eliminates the step of, and such improved mounting apparatus eliminates the mechanism for, punching the auxiliary support from the strip after the insertion operation. By severing a preformed auxiliary support from the strip, such improved method and apparatus eliminate strip waste and reduce shock forces on the flashed end brittle filament. Further, an automatic positive strip feed mechanism of the improved apparatus eliminates manual feeding of the strip into the filament and also the attendant variable inserting forces heretofore manually applied to such filament. In addition, the improved mounting apparatus and method provide annealing for the flashed brittle filament during the entire inserting operation. Such improved mounting apparatus also supports or backs up the filament on, and adjacent to, the line of insertion during the support inserting operation with the result that the inserting force is applied by the strip to a supported portion of the filament.

A still further benefit of the improved mounting apparatus is the provision of an improved filament holder which can be readily and easily loaded with a filament and which will protect the cleaned filament from any deleterious substances associated with the improved mounting apparatus. The use of a prescored pierce mark on the improved strip facilitates the support piercing operation, eliminates the need for vibration of the piercing tool during such support piercing operation and reduces filament breakage. Further, such improved mounting apparatus utilizes the movable cutter as a simplified filament advancing mechanism, which movable cutter substantially eliminates any destructive contact with the filament during the filament advancing operation. Again the improved mounting apparatus is automatic in its operation as distinguished from the semi-automatic hand operated conventional inserting and securing apparatus.

The forward portions improved strip of the present invention do not contact the filament during the inserting operation with the result that filament breakage is reduced.

While in accordance with the patent statutes a preferred embodiment of the present invention has been illustrated and described in detail, it is to be particularly understood that the invention is not limited thereto or thereby.

We claim:

1. The method of inserting an auxiliary support between predetermined successive turns of a filament, said auxiliary support being provided with an open slot on its leading edge, said open slot having a width greater than the outside diameter of said filament, said method comprising the steps of supporting said filament transverse to the line of insertion and at the point of insertion, and inserting the auxiliary support between said predetermined successive turns so that said open slot clears said filament and until the back of said open slot is contiguous to but not in contact with a connecting half turn between said predetermined successive turns.

2. The method of mounting an auxiliary support between predetermined successive turns of a filament, said auxiliary support being provided with an open slot on its leading edge and a pierce mark, said open slot having a width greater than the outside diameter of said filament, said method comprising the steps of positioning said predetermined successive turns of said filament for the inserting operation, centralizing the portion of said filament beyond said predetermined successive turns for the inserting operation, supporting said filament transverse to the line of insertion and at the point of insertion, vibrating said supported filament during the inserting operation to open said predetermined successive turns and to guide said strip therebetween, inserting the auxiliary support between said predetermined successive turns so that said open slot clears said filament and until the back of said open slot is contiguous to but not in contact with a connecting half turn between said predetermined successive turns, and securing said inserted auxiliary support to said filament by moving a piercing mandrel through said filament and through said pierce mark to peen the protruding edges of said pierce mark on said auxiliary support over against said filament.

3. The method of mounting a leading auxiliary support on a strip between predetermined successive turns of a filament, said strip comprising said leading auxiliary support and a plurality of other auxiliary supports, said leading auxiliary support and said other auxiliary supports each being formed successively in said strip in end-to-end relation with each other along a substantially straight cut-off line, each of said other auxiliary supports being provided with a pierce mark and a closed slot, a portion of which closed slot overlaps an adjacent cut-off line, said leading auxiliary support being provided with an open slot on its leading edge and a pierce mark, said open slot and said closed slots having a width greater than the outside diameter of said filament, said method comprising the steps of supporting said filament transverse to the line of insertion and at the point of insertion, inserting the leading auxiliary support between said predetermined successive turns so that said open slot clears said filament and until the back of said open slot is contiguous to but not in contact with a connecting half turn between said predetermined successive turns, securing said inserted leading auxiliary support to said filament by moving a piercing mandrel through said filament and through said pierce mark to peen the protruding edges of said pierce mark on said leading auxiliary support over against said filament, and severing said inserted leading auxiliary support from said strip along the adjacent substantially straight cut-off line to form the closed slot adjacent said leading auxiliary support into an open slot.

4. The method of mounting a leading auxiliary support on a strip between predetermined successive turns of a filament, said strip comprising said leading auxiliary support and a plurality of other auxiliary supports, said leading auxiliary support and said other auxiliary supports each being formed successively in said strip in end-to-end relation with each other along a substantially straight cut-off line, each of said other auxiliary supports being provided with a pierce mark and a closed slot, a portion of which closed slot overlaps an adjacent cut-off line, said leading auxiliary support being provided with an open slot on its leading edge and a pierce mark, said open slot and said closed slots having a width greater than the outside diameter of said filament, said method comprising the steps of supporting said filament transverse to the line of insertion and at the point of insertion, vibrating said supported filament during the inserting operation to open said predetermined successive turns and to guide said strip therebetween, inserting the leading auxiliary support between said predetermined successive turns so that said open slot clears said filament and until the back of said open slot is contiguous to but not in contact with a connecting half turn between said predetermined successive turns, securing said inserted leading auxiliary support to said filament by moving a piercing mandrel through said filament and through said pierce mark to peen the protruding edges of said pierce mark on said leading auxiliary support over against said filament, and severing said inserted leading auxiliary support from said strip along the adjacent substantially straight cut-off line to form the closed slot adjacent said leading auxiliary support into an open slot while advancing said filament for the next inserting operation.

5. The method of mounting a leading auxiliary support on a strip between predetermined successive turns of a filament, said strip comprising said leading auxiliary support and a plurality of other auxiliary supports, said leading auxiliary support and said other auxiliary supports each being formed successively in said strip in end-to-end relation with each other along a substantially straight cut-off line, each of said other auxiliary supports being provided with a pierce mark and a closed slot, a portion of which closed slot overlaps an adjacent cut-off line, said leading auxiliary support being provided with an open slot on its leading edge and a pierce mark, said open slot and said closed slots having a width greater than the outside diameter of said filament, said method comprising the steps of positioning said predetermined successive turns of said filament for the inserting operation, centralizing the portion of said filament beyond said predetermined successive turns for the inserting operation, supporting said filament transverse to the line of insertion and at the point of insertion, vibrating said supported filament during the inserting operation to open said predetermined successive turns and to guide said strip therebetween, inserting the leading auxiliary support between said predetermined successive turns so that said open slot clears said filament and until the back of said open slot is contiguous to but not in contact with a connecting half turn between said predetermined successive turns, securing said inserted leading auxiliary support to said filament by moving a piercing mandrel through said filament and through said pierce mark to peen the protruding edges of said pierce mark on said leading auxiliary support over against said filament, and severing said inserted leading auxiliary support from said strip along the adjacent substantially straight cut-off line to form the closed slot adjacent said leading auxiliary support into an open slot while advancing said filament for the next inserting operation.

6. Apparatus for mounting a leading auxiliary support on a strip between predetermined successive turns of a filament, said strip comprising said leading auxiliary support and a plurality of other auxiliary supports, said leading auxiliary support and said other auxiliary supports each being formed successively in said strip in end-to-end relation with each other along a substantially straight cut-off line, each of said other auxiliary supports being provided with a pierce mark and a closed slot, a portion of which closed slot overlaps an adjacent cut-off line, said leading auxiliary support being provided with an open slot on its leading edge and a pierce mark, said open slot and said closed slots having a width greater than the outside diameter of said filament, said apparatus comprising positioning means movable from a retracted filament loading position to a filament presenting position for positioning said predetermined successive turns of said filament for the inserting operation, back-up supporting means movable from a retracted position into engagement with said filament for supporting said filament transverse to the line of insertion and at the point of insertion, strip inserting means aligned with said predetermined successive turns for inserting said leading auxiliary support between said predetermined supported successive turns so that said open slot clears said filament and until the back of said open slot is contiguous to but not in contact with a connecting half turn between said predetermined successive turns, securing means disposed within said filament for moving through said filament and through said pierce mark to peen the protruding edges of said pierce mark on said leading auxiliary support over against said filament, thus locking said inserted leading auxiliary support to said filament, and severing means adjacent said back-up supporting means and movable when the latter is retracted in a direction parallel the longitudinal axis of said filament to sever said inserted leading auxiliary support from said strip along the substantially straight adjacent cut-off line between said leading auxiliary support and the support adjacent thereto to form the closed slot adjacent said leading auxiliary support into an open slot.

7. Apparatus for mounting a leading auxiliary support on a strip between predetermined successive turns of a filament, said strip comprising said leading auxiliary support and a plurality of other auxiliary supports, said leading auxiliary support and said other auxiliary supports each being formed successively in said strip in end-to-end relation with each other along a substantially straight cut-off line, each of said other auxiliary supports being provided with a pierce mark and a closed slot, a portion of which closed slot overlaps an adjacent cut-off line, said leading auxiliary support being provided with an open slot on its leading edge and a pierce mark, said open slot and said closed slots having a width greater than the outside diameter of said filament, said apparatus comprising positioning means movable from a retracted filament loading position to a filament presenting position for positioning said predetermined successive turns of said filament for the inserting operation, back-up supporting means movable from a retracted position into engagement with said filament for supporting said filament transverse to the line of insertion and at the point of insertion, vibrating means associated with said back-up supporting means for vibrating said supported filament during the inserting operation to open said predetermined successive turns and to guide said strip therebetween, strip inserting means aligned with said predetermined successive turns for inserting said leading auxiliary support between said predetermined supported successive turns so that said open slot clears said filament and until the back of said open slot is contiguous to but not in contact with a connecting half turn between said predetermined successive turns, securing means disposed within said filament for moving through said filament and through said pierce mark to peen the protruding edges of said pierce mark on said leading auxiliary support over against said filament, thus locking said inserted leading auxiliary support to said filament, and severing means adjacent said back-up supporting means and movable in a direction parallel the longitudinal axis of said filament to sever said inserted leading auxiliary support from said strip along the adjacent substantially straight cut-off line between said leading auxiliary support and the support adjacent thereto to form the closed slot adjacent said leading auxiliary support into an open slot.

References Cited in the file of this patent
UNITED STATES PATENTS
2,813,327    Fridrich _____ Nov. 19, 1957